L. P. KEACH.
Gas Stove.

No. 10,806. Patented April 18, 1854.

UNITED STATES PATENT OFFICE.

LAWSON P. KEACH, OF BALTIMORE, MARYLAND.

COOKING OYSTERS, &c.

Specification of Letters Patent No. 10,806, dated April 18, 1854.

*To all whom it may concern:*

Be it known that I, LAWSON P. KEACH, of the city of Baltimore, in the State of Maryland, have invented a certain new and useful Improvement in Cooking, of which the following is a full, clear, and exact description, reference being had to the accompanying drawing, which forms part of this specification, and in which—

Figure 1:
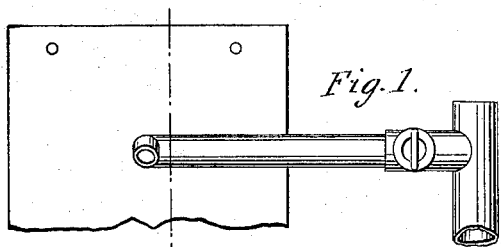
Figure 3:
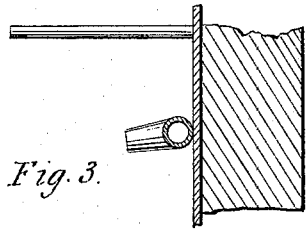
Figure 2:
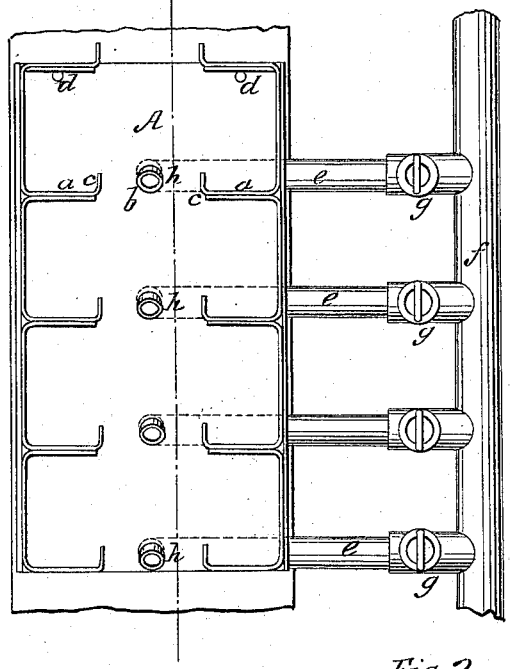
Figure 2:
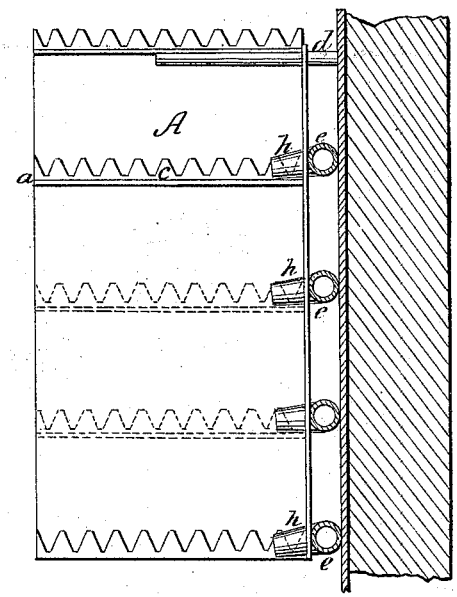
Figure 2:
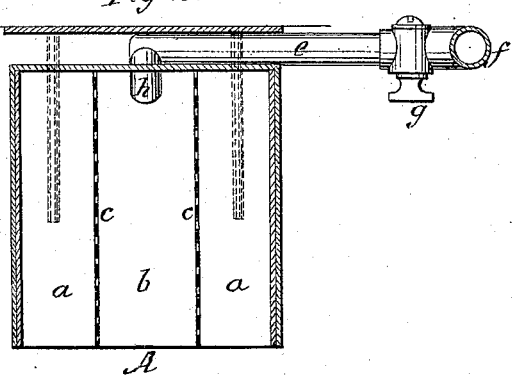

Figure 1 represents a front elevation of the cooking apparatus complete; Fig. 2, a horizontal section thereof; and Fig. 3 a vertical section of the same through the line X X in Fig. 1.

My improvement has reference to the roasting of oysters, clams and other similar or suitable articles.

In roasting oysters by the ordinary stove oven, or on or over the fire, much time is necessarily consumed before the heat is made to penetrate the shell, and in restaurants, hotels and other places of the like kind, where time in serving up is a consideration of importance, it becomes necessary to have the oven constantly heated and always ready for roasting, even when the demand is but limited and irregular, as to light a fire or increase the heat of the oven for each order as it is given would involve too great a loss of time. This necessity of constantly keeping the oven or fire ready renders the consumption of fuel exceedingly costly and, where the demand for such cooked articles is but small, makes the supplying of them unprofitable. But even with an oven always ready, the manner in which the heat is applied makes the ordinary process of roasting oysters a slow one, and in the removal of the oysters, as they open or are roasted, one by one from the oven, those which were first taken out lose a large portion of their heat or become cold before the rest are ready to be served up with them, or otherwise they are unequally and improperly cooked if deferring to take them out of the oven till all are roasted, while much inconvenience and cooling of them arises in the transferring of them on a tray or plateau from the oven in the kitchen to the eating apartment where they are served up.

To obviate these and other inconveniences and losses, and to be enabled to serve up the oysters hot with expedition at any time in a most convenient and economical manner, is the object of my invention.

To accomplish this improvement I adopt the well known process for other purposes, and in different ways, of cooking by gas, in the following novel manner. A portable metallic oven (A), of four (more or less) partitions or chambers in it, serves to contain the oysters to be roasted. The several chambers formed by these partitions should be somewhat larger than the largest sized oyster so as to admit of the oysters being easily entered and taken out of the oven which is open in front for that purpose, the sides and back of it being closed. The ledges or shelves (a) which form the partitions do not extend across the oven but project only from either side sufficiently to leave a space or opening (b) between them of a size or width across of somewhat less than the breadth of a small sized oyster, so that the oyster rests upon the inside edges of the shelves which may be turned up and notched or cut into a vandyke border (c) for the purpose of forming a better hold for the oyster and of allowing the flame to pass through it around the oyster. The oysters thus seated on the ledges which form the partitions (one oyster to each chamber or pair of shelves) have their mouths toward the front of the oven.

To roast the oysters in the oven, the oven is hung on hooks or pegs (d) which project from and form a rack or frame that may have a series of pegs one above the other to accommodate a number of the said removable ovens and that may be run up against the wall either of the kitchen or—which may be more convenient—of the eating compartment. On the front of the rack or frame are a series of horizontal tubes (e) that form branches from a main vertical gas pipe (f) and that are provided with separate valves or stop cocks (g). These branch tubes terminate in bat wing or spread gas burners or nozzles (h) which project at right angles from the branch tubes and incline slightly downward from the horizontal position. The distances of these nozzles or burners apart correspond with the height of the chambers of the oven or thereabouts and their relative positions with the hooks or pegs of the rack is such as to cause them to enter the back of the oven through perforations made for that purpose at a little below the level of the raised edges of the ledges on which the oysters rest.

Now it is evident from the foregoing description, that, upon opening the cocks of the branch tubes and lighting the gas as it issues from the burners or nozzles (h), the flame from the intermediate burners will be projected slightly downward causing the flame to strike obliquely the bottom of the one oyster and to be projected against the top of the oyster underneath over the surface of which it will spread and act and be turned upward so as to act over the entire bottom surface of the oyster above, the flame ascending around the edges of the oyster through the openings in the carrying raised portions of the ledges and lapping around the oyster and uniting with the flame of the burner above it, thus enveloping the oyster in flame applied direct to the shell; and in the case of the intermediate burners, the flame from each nozzle serving to act upon the top of one oyster and the bottom of another; while in the case of the top and bottom burners the flames will act upon the bottoms of the oysters against which they project or impinge and lap around and spread over the tops, the upper oyster of all having a powerful heat applied to it by reason of the combined flames of the other or lower burners which renders a distinct jet of gas upon its top unnecessary. This arrangement and dipping position of the burners makes the one burner answer for each oyster, where two would otherwise be necessary, and causes heat to be applied alike on the top as on the bottom of the shell, whereby the fish will be more thoroughly or uniformly cooked. By the oysters being thus enveloped in flame applied direct to the shell, the roasting of them it is obvious will be most expeditious, and, by means of the taps or cocks, the flame to each oyster may be regulated at pleasure to suit the varied sizes of the oysters or thicknesses of their shells, so as to insure all the oysters in the oven being thoroughly roasted at or about the same time; or, if the oysters open or finish roasting irregularly, the flame impinging on the cooked oysters may be shut off by closing the appropriate tap and the oysters remain in the oven till the whole of them therein are cooked, when, upon shutting off the gas of all the burners, the oven is lifted off the rack and the oysters conveyed in it, hot and in the shell, to where they are required to be served up, thus dispensing with the cooling of them by taking them out of the oven, one by one, as they are roasted and by transferring them on a tray or plateau as is usually done.

The rapidity of this method of roasting oysters, coupled with its convenience, cleanliness and large economy by reason not only of the manner in which the heat is applied but by the advantage which is derived in cooking by gas in having at command an instantaneous and sufficient heat without involving consumption of fuel or loss when there are no orders on hand or occasion for the use of the flame which is then shut off, will cause the present system of roasting oyster, in restaurants and other places of the like kind, to be universally superseded by it.

The construction and arrangement of the ovens and gas pipes or burners, it is obvious, may be variously modified without departing from the principle of my invention, as for instance, the ovens may be made either single or double or of a different shape to that represented, and the burners may be introduced somewhat differently to cause the flame to act upon the top and bottom shells; and a different form of rack for carrying the ovens may be used, or the rack be entirely dispensed with and the ovens hung upon the burners or otherwise supported. These and other modifications are optional with those using such things and will depend, in a great measure, upon circumstances, such as, the disposition of the ordinary gas pipes in a room, or the large or small amount of trade of the restaurant, &c. Another modification may be to make the shells of the oven either separately or unitedly loose in the case of the oven so as to draw out the oysters from the oven when cooked: or the oven may be dispensed with and the oysters be supported or carried on pegs projecting from the rack or on any other suitable stand to suit the range or series of horizontal burners. But it is unnecessary further to dilate upon these modifications of details, which, in roasting clams or other articles besides oysters having a shell or other similar natural covering, may be varied as circumstances direct.

I do not claim, of itself, cooking by jets of gas applied to the shell or covering of the article of food to be roasted; but I do claim, as new and useful, The method herein described of roasting oysters or other articles of food having a shell or similar natural covering by arranging the oysters on supports at a suitable distance apart for the play of the flame of gas, issuing from gas pipes or burners, on or against their shells, when the said burners are so arranged that the flame of the one burner, jutting horizontally or slightly dipping from the horizontal position, impinges and acts upon the top shell of one oyster and the bottom shell of another, as herein set forth, whereby the fish is more thoroughly cooked and one burner serves for two oysters, as specified.

In testimony whereof, I have hereunto subscribed my name.

LAWSON P. KEACH.

Witnesses:
SAML. GRUBB,
ALFD. GREGORY.